United States Patent
Park (10) Patent No.: US 12,197,224 B2
(45) Date of Patent: Jan. 14, 2025

(54) PLATOON DRIVING CONTROL SYSTEM AND METHOD OF VEHICLE

(71) Applicant: HYUNDAI MOBIS CO., LTD., Seoul (KR)

(72) Inventor: Seung Jin Park, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 148 days.

(21) Appl. No.: 17/338,058

(22) Filed: Jun. 3, 2021

(65) Prior Publication Data

US 2021/0382492 A1  Dec. 9, 2021

(51) Int. Cl.
*G05D 1/00* (2024.01)
*B60L 53/66* (2019.01)
(Continued)

(52) U.S. Cl.
CPC .......... *G05D 1/0217* (2013.01); *B60L 53/665* (2019.02); *B60L 58/12* (2019.02);
(Continued)

(58) Field of Classification Search
CPC .............. G05D 1/0217; G05D 1/0295; G05D 2201/0213; G05D 1/0278; G05D 1/0291;
(Continued)

(56) References Cited

U.S. PATENT DOCUMENTS 9,940,840 B1 * 4/2018 Schubert ............ G01C 21/3407
10,017,179 B2 * 7/2018 Alden ............... B60W 60/0023
(Continued)

FOREIGN PATENT DOCUMENTS

CN  203287991 U * 11/2013
CN  109159676 A * 1/2019
(Continued)

OTHER PUBLICATIONS

English Translation for CN-109159676-A (Year: 2019).*
(Continued)

*Primary Examiner* — Faris S Almatrahi
*Assistant Examiner* — Moises Gasca Alva
(74) *Attorney, Agent, or Firm* — MORGAN, LEWIS & BOCKIUS LLP (57) ABSTRACT

A platoon driving control system of a vehicle includes a processor, a navigation, and a driving controller communicatively connected to one another. The processor is configured to estimate a charging amount of a power source that drives a driving device or an available driving distance of each vehicle included in a platoon. The navigation is configured to set a driving route based on a destination of the platoon and search for a charging station for the power source based on the set driving route. The processor is further configured to determine a charging strategy of the power source of the platoon based on the charging amount or the available driving distance of each vehicle, the driving route set by the navigation, and the searched charging station. The driving controller is configured to control driving of the platoon based on the driving route set by the navigation and the charging strategy.

18 Claims, 5 Drawing Sheets

(51) Int. Cl.
  *B60L 58/12*  (2019.01)
  *G01C 21/34*  (2006.01)
  *G06Q 30/0283*  (2023.01)

(52) U.S. Cl.
  CPC ..... *G01C 21/3469* (2013.01); *G01C 21/3476* (2013.01); *G05D 1/0295* (2013.01); *G06Q 30/0283* (2013.01)

(58) Field of Classification Search
  CPC .. G05D 1/0005; G05D 1/0289; G05D 1/0276; G05D 1/0088; B60L 53/665; B60L 58/12; B60L 53/64; B60L 58/13; B60L 2260/52; B60L 2260/54; B60L 53/63; B60L 2240/64; B60L 2240/662; B60L 2240/68; B60L 2240/80; G01C 21/3469; G01C 21/3476; G06Q 30/0283; Y02T 10/70; Y02T 10/7072; Y02T 10/72; Y02T 90/12; Y02T 90/16; Y02T 90/167; Y04S 10/126; Y04S 30/14; G08G 1/22; Y02E 60/00
  See application file for complete search history.

(56) References Cited

U.S. PATENT DOCUMENTS

| | | | |
|---|---|---|---|
| 2011/0320115 A1* | 12/2011 | Oh | G08G 1/096866 701/420 |
| 2015/0151637 A1* | 6/2015 | Suzuki | B60L 3/12 701/22 |
| 2016/0244062 A1 | 8/2016 | Tudosie | |
| 2016/0334233 A1* | 11/2016 | Baverstock | B60W 10/18 |
| 2017/0262790 A1* | 9/2017 | Khasis | G08G 1/012 |
| 2017/0293296 A1* | 10/2017 | Stenneth | G06Q 20/10 |
| 2018/0058868 A1 | 3/2018 | Kang et al. | |
| 2019/0236959 A1* | 8/2019 | Belapurkar | G08G 1/22 |
| 2020/0073408 A1* | 3/2020 | Kim | G08G 1/22 |
| 2020/0074372 A1* | 3/2020 | Whaling | G06Q 30/0206 |
| 2020/0257312 A1* | 8/2020 | Suzuki | G08G 1/22 |

FOREIGN PATENT DOCUMENTS

| | | |
|---|---|---|
| CN | 110736477 A | 1/2020 |
| DE | 102016224786 A1 * | 6/2018 |
| JP | 2009133779 A * | 6/2009 |
| JP | 2017009476 A * | 1/2017 |
| KR | 20090123330 A * | 12/2009 |
| KR | 10-2017-0034696 A | 3/2017 |
| WO | WO-2019023324 A1 * | 1/2019 |

OTHER PUBLICATIONS

English Translation for KR 20090123330 A (Year: 2009).*
English Translation for CN-203287991-U (Year: 2013).*
English Translation for JP-2009133779-A (Year: 2009).*
English Translation for JP-2017009476-A (Year: 2017).*
English Translation for DE-102016224786-A1 (Year: 2018).*
Office Action issued Jun. 17, 2023 for counterpart Chinese Patent Application No. 202110627507.X (see English translation).
Decision on Rejection issued in corresponding Chinese Patent Application No. 202110627507X dated Mar. 2, 2024, with English translation.

* cited by examiner

PLATOON DRIVING CONTROL SYSTEM AND METHOD OF VEHICLE

CROSS REFERENCE TO RELATED APPLICATION

The present application claims priority to Korean Patent Application No. 10-2020-0067937, filed Jun. 4, 2020, the entire contents of which is incorporated herein for all purposes by this reference.

BACKGROUND

Technical Field

The present disclosure relates to a platoon driving control system of a vehicle and method thereof, and more particularly, to a driving control capable of optimizing fuel charging of a vehicle that autonomously performs platoon driving.

Description of the Related Art

The development of the technology incorporating various sensors and electronic devices into vehicles is accelerating in order to increase the safety and convenience of users who use vehicles. In particular, a system that provides various functions (e.g., smart cruise control, lane keeping assistance) developed for the user's driving convenience has been mounted on a vehicle. Accordingly, so-called autonomous driving, in which a vehicle travels on a road in consideration of an external environment by itself without driver's manipulation, has been developing step by step.

Platoon driving, which is included as one of autonomous driving, means that a plurality of vehicles grouped into a group travels autonomously in consideration of the external environment, respectively, and travels on the road while sharing driving information with each other.

In particular, a leader vehicle and a follower vehicle are included in one platoon. The leader vehicle is a vehicle that leads the platoon at the forefront of the platoon, and the follower vehicle is a vehicle that follows the leader vehicle.

Platoon driving is mainly achieved by performing distance control between the leader vehicle at the head of the lane and a number of vehicles following the guidance of the leader vehicle while communicating with each other. In general, each vehicle in a platoon is equipped with a plurality of sensors to enable individual autonomous driving.

However, in the autonomous driving technology according to a conventional technology, there is a problem that a strategy for charging fuel at a gas station and the like is not included in a driving strategy for driving to a destination.

The matters described as background art are only for improving understanding of the background of the present disclosure, and should not be taken as acknowledging that they correspond to the prior art already known to those of ordinary skill in the art.

SUMMARY

The present disclosure has been proposed to solve such a problem, and is to provide a platoon driving control technology including a charging strategy for a power source that drives a driving device of a vehicle.

In order to achieve the purpose above, the platoon driving control system of a vehicle according to the present disclosure includes a processor, a navigation, and a driving controller communicatively connected to one another, wherein the processor is configured to estimate a charging amount of a power source that drives a driving device or an available driving distance of each vehicle included in a platoon, the navigation is configured to set a driving route based on a destination of the platoon and to search for a charging station for the power source based on the set driving route, the processor is further configured to determine a charging strategy of the power source of the platoon based on the estimated charging amount or the estimated available driving distance of each vehicle, the driving route set by the navigation, and the searched charging station, and the driving controller is configured to control driving of the platoon based on the driving route set by the navigation and the charging strategy determined by the processor.

The platoon driving control system may further include an inputter that receives the destination of the platoon or selectively receives a required arrival time of the platoon, and the processor may determine the charging strategy based on the destination and the required arrival time when the required arrival time is inputted to the inputter.

The processor may calculate a required charging amount for each vehicle according to the driving route set by the navigation based on the estimated charging amount or available driving distance of each vehicle, and determine the charging strategy of the platoon based on the calculated required charging amount of each vehicle.

The controller may control an arrangement of the platoon so that an available driving distance of the platoon increases based on the estimated charging amount or available driving distance of each vehicle.

The processor may calculate a charging cost of the power source based on cost information of the searched charging station, and determine a minimum cost strategy that minimizes the calculated charging cost as the charging strategy.

The processor may calculate the charging cost of the power source based on inputted or pre-stored payment information of a user or each vehicle included in the platoon.

When the processor determines the minimum cost strategy as the charging strategy, the driving controller may divide the driving route into a plurality of sections based on driving information of the driving route set by the navigation, allocate a required time for each section, and control the driving of the platoon based on an optimum fuel economy according to the required time allocated for each section and the driving information.

The processor may calculate a required time according to the driving route set by the navigation based on expected charging time of the searched charging station, and determine a minimum time strategy that minimizes the calculated required time as the charging strategy.

The processor may calculate a charging cost of the power source based on cost information of the charging station included in the minimum time strategy in which the calculated required time is calculated equally, and determine the minimum time strategy that minimizes the calculated charging cost as the charging strategy.

When the processor determines a minimum time strategy as the charging strategy, the driving controller may control the driving of the platoon to minimize required time according to the driving route set by the navigation.

In order to achieve the purpose above, a method for controlling platoon driving of a vehicle according to the present disclosure includes steps of: setting a driving route based on a destination of a platoon; searching for a charging station of a power source that drives a driving device of each vehicle included in the platoon based on the set driving route; determining a charging strategy of the power source of the platoon based on a charging amount of the power source or available driving distance of each vehicle, the driving route set by a navigation, and the searched charging station; and controlling the driving of the platoon based on the set driving route and the determined charging strategy.

Prior to the step of setting a driving route, the method may further include a step of inputting the destination of the platoon or selectively inputting a required arrival time of the platoon, and in the step of determining a charging strategy, when the required arrival time is input, the charging strategy may be determined based on the destination and the required arrival time.

Prior to the step of determining a charging strategy, the method may further include a step of calculating a required charging amount of each vehicle according to the driving route set by the navigation based on an estimated charging amount or available driving distance of each vehicle, and in the step of determining a charging strategy, the charging strategy of the platoon may be determined based on the calculated required charging amount of each vehicle.

Prior to determining a charging strategy, the method may further include a step of controlling an arrangement of the platoon so that an available driving distance of the platoon increases based on an estimated charging amount or available driving distance of each vehicle.

In the step of determining a charging strategy, a charging cost of the power source may be calculated based on cost information of the searched charging station, and a minimum cost strategy that minimizes the calculated charging cost may be determined as the charging strategy.

In the step of determining a charging strategy, the charging cost of the power source may be calculated based on input or pre-stored payment information of a user or each vehicle included in the platoon.

In the step of controlling the driving of the platoon, when the minimum cost strategy is determined as the charging strategy, the driving route may be divided into a plurality of sections based on driving information of the set driving route, a required time may be allocated for each section, and the driving of the platoon may be controlled based on an optimal fuel economy according to the required time allocated for each section and the driving information.

In the step of determining a charging strategy, a required time according to the set driving route may be calculated based on an expected charging time of the searched charging station, and a minimum time strategy that minimizes the calculated required time may be determined as the charging strategy.

In the step of determining a charging strategy, a charging cost of the power source may be calculated based on cost information of the charging station included in the minimum time strategy in which the calculated required time is calculated equally, and the minimum time strategy that minimizes the calculated charging cost may be determined as the charging strategy.

In the step of controlling the driving of the platoon, when a minimum time strategy is determined as the charging strategy, the driving of the platoon may be controlled to minimize a required time according to the set driving route.

In the platoon driving control system of a vehicle and method thereof according to the present disclosure, it has the effect of implementing autonomous driving that reflects a charging strategy according to a user's intention.

In addition, accordingly, it has the effect of optimizing a charging cost of a power source or optimizing driving time according to a driving route.

DETAILED DESCRIPTION

Specific structural or functional descriptions of the embodiments of the present disclosure disclosed in this specification or application are exemplified only for the purpose of describing the embodiments according to the present disclosure, and the embodiments according to the present disclosure may be implemented in various forms, and should not be construed as being limited to the embodiments described in this specification or application.

Since the embodiments according to the present disclosure can be modified in various ways and have various forms, specific embodiments are illustrated in the drawings and will be described in detail in the present specification or application. However, this is not intended to limit the embodiments according to the concept of the present disclosure to a specific form of disclosure, and it should be understood that all changes, equivalents, and substitutes included in the spirit and scope of the present disclosure are included.

Terms such as first and/or second may be used to describe various components, but the components should not be limited by the terms. The above terms are only for the purpose of distinguishing one component from other components, for example, without departing from the scope of the rights according to the concept of the present disclosure, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present disclosure. Singular expressions include plural expressions unless the context clearly indicates otherwise. In the present specification, terms such as "comprise" or "have" are intended to designate the presence of a set feature, number, step, action, component, part, or combination thereof, but it should be understood that the presence or additional possibilities of one or more other features, numbers, steps, actions, components, parts, or combinations thereof are not preliminarily excluded.

Unless otherwise defined, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning of the related technology, and should not be interpreted as an ideal or excessively formal meaning unless explicitly defined in the present specification.

Hereinafter, the present disclosure will be described in detail by describing a preferred embodiment of the present disclosure with reference to the accompanying drawings. The same reference numerals shown in each drawing indicate the same members.

Figure 1:
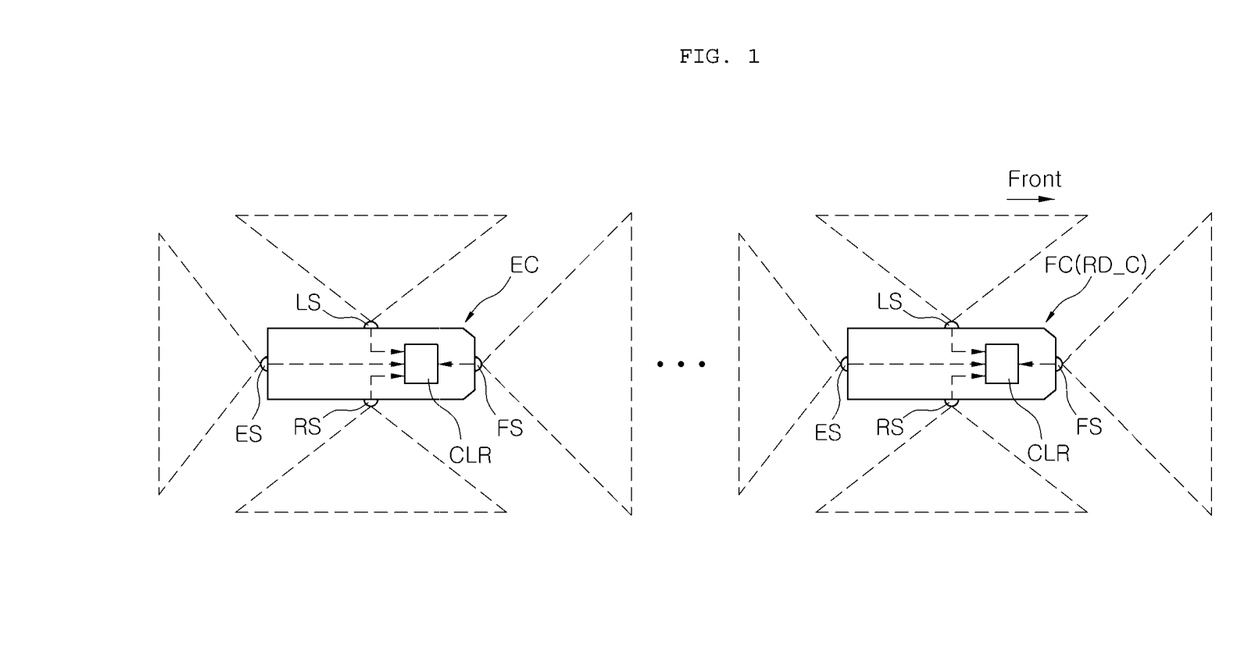
FIG. 1 is a diagram illustrating platooning vehicles to which a platoon driving control system of a vehicle according to an embodiment of the present disclosure can be applied.
Figure 2:
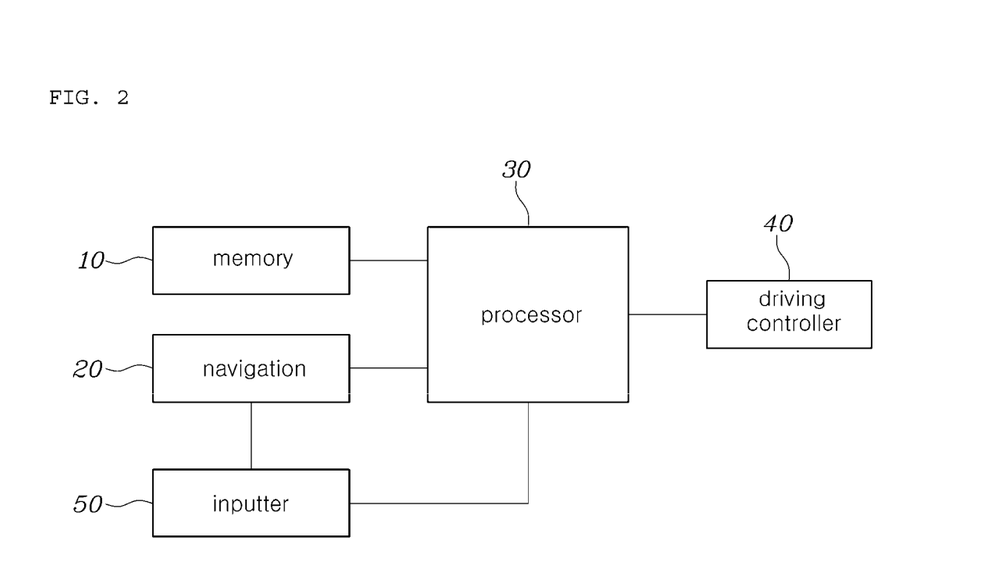
FIG. 2 is a block diagram of a platoon driving control system of a vehicle according to an embodiment of the present disclosure.

FIG. 1 is a diagram illustrating platooning vehicles to which a platoon control system of a vehicle according to an embodiment of the present disclosure can be applied, and FIG. 2 is a block diagram of a platoon driving control system of a vehicle according to an embodiment of the present disclosure.

Referring to FIGS. 1 to 2, a number of vehicles from the frontmost vehicle (FC) to the rearmost vehicle (EC) run in a row in sequence. Each vehicle is equipped with a number of sensors, and a controller (CLR) that recognizes various obstacles around the vehicle and controls the vehicle based on the signals of these sensors. The controllers (CLRs) of each of these vehicles share necessary data through mutual communication and transfer commands according to a predetermined command system, so that the moving to the destination by continuous platooning can be occurred.

For reference, in FIG. 1, the sensors of each vehicle are indicated as having a front sensor (FS), a left sensor (LS), a right sensor (RS), and a rear sensor (ES), but in actual vehicles, there are more sensors or various changes are possible, such as being provided or partially omitted.

In addition, the foremost vehicle FC is a leader vehicle (RD_C), and serves to lead the following vehicles at the forefront of the group of vehicles performing platooning.

The platoon driving control system of a vehicle according to an embodiment of the present disclosure includes a processor 30 that estimates a charging amount of a power source that drives a driving device or an available driving distance of each vehicle included in a platoon; a navigation 20 that sets a driving route based on a destination of the platoon and searches for a charging station for the power source based on the set driving route; a processor 30 that determines a charging strategy of the power source of the platoon based on the charging amount or the available driving distance of each vehicle estimated by the processor 30, the driving route set by the navigation 20, and the searched charging station; and a driving controller 40 that controls driving of the platoon based on the driving route set by the navigation 20 and the charging strategy determined by the processor 30.

The processor 30, the navigation 20, the processor 30, the driving controller 40 and the inputter 50 according to an exemplary embodiment of the present disclosure may be implemented by an algorithm configured to control the operation of various components of the vehicle, a nonvolatile memory 10 configured to store data related to software instruction reproducing the algorithm, and a processor (not shown) configured to perform the operation described below using the data stored in the memory 10. Here, the memory 10 and the processor may be implemented as separate chips. Alternatively, the memory 10 and processor may be implemented as a single chip integrated with each other. The processor may take the form of one or more processors.

The processor 30, the navigation 20, the processor 30, the driving controller 40, and the inputter 50 according to one embodiment may be included in the electronic control unit (ECU) of the vehicle (in particular, a leader vehicle) included in a platoon, or in a separate controller that controls autonomous driving of the vehicle.

In another embodiment, the processor 30, the navigation 20, the processor 30, the driving controller 40, and the inputter 50 may be included in a separate control device that controls platoon driving.

The processor 30 may estimate a charging amount of a power source that drives a driving device or an available driving distance of the vehicles included in a platoon in real time. The driving device of the vehicle may be a device that generates various power, such as an engine or a motor, and the power source is a fuel or energy source of the driving device, and may be gasoline, diesel, electricity, or hydrogen.

Specifically, the processor 30 may estimate the charging amount of the power source stored in a fuel tank or battery that stores the power source of each vehicle. In one embodiment, the charging amount of the power source may be estimated by receiving the sensing data of the volume or load of the fuel stored in the fuel tank, the pressure inside the fuel tank, or the state of charge (SOC) of the battery or the like.

In addition, the processor 30 may estimate an available driving distance using the charging amount of the power source and the expected fuel economy included in a vehicle. For example, the available driving distance can be estimated by multiplying the expected fuel consumption by the estimated charging amount of the power source.

Here, the expected fuel economy may be predicted based on the vehicle speed according to real-time road conditions, using previously stored data of the average fuel economy table for each vehicle speed.

That is, the processor 30 may estimate the charging amount of the power source or the available driving distance of each vehicle through data input from each vehicle included in the platoon, or the charging amount of the power source or the available driving distance can be input from each vehicle through the inputter 50 to be described later.

The navigation 20 may set a driving route of a platoon based on the destination of the platoon. Specifically, the navigation 20 may be connected to a GPS installed on the vehicle included in the platoon to receive the current location of the vehicle, and may be connected to a communication device to receive real-time traffic condition. The navigation 20 may set various driving routes such as the shortest time priority, the shortest distance priority, or toll-free road priority based on the input real-time traffic condition, and select one of the set driving routes.

In addition, the navigation 20 may search for a charging station of a power source based on a driving route. In particular, the navigation 20 may search for a charging station of a power source located on the driving route or located less than a preset distance in the driving route.

In addition, a charging station may be searched based on the type of the power source preset for the vehicle included in a platoon. In other words, in the case of an electric vehicle (EV), an electric charging station can be searched, in the case of an engine vehicle, a gas station can be searched, in the case of a hydrogen vehicle (FCEV), a hydrogen station can be searched, and in the case of a rechargeable hybrid vehicle (PHEV), an electric charging station and gas station can be searched, respectively.

In addition, when the types of the power sources of the vehicles included in a platoon are various, the charging station of each power source may be respectively searched.

The processor 30 may determine a charging strategy of a power source based on the charging amount of the power source in the driving route and the searched charging station. Here, the charging strategy may be a control strategy regarding how many times the power source is charged on the driving route, or which charging station among the searched charging stations charges the power source.

The driving controller 40 may control the driving of a platoon based on the set driving route and the determined charging strategy. Specifically, the driving controller 40 may control autonomous driving of the platoon by controlling various sensors, driving devices, and steering devices of the vehicle included in the platoon or controlling the driving of the leader vehicle or trailing vehicle and the like included in the platoon.

An inputter 50 that receives a destination of a platoon or selectively receives a required arrival time of the platoon is further included. The processor 30 can determine a charging strategy based on the destination and the required arrival time when the required arrival time is input to the inputter 50.

The inputter 50 may be an operation panel or an audio video navigation (AVN) device directly operated by a driver or a user, and may be a communication device wirelessly connected to a mobile communication terminal or the like as another embodiment.

Figure 3A:
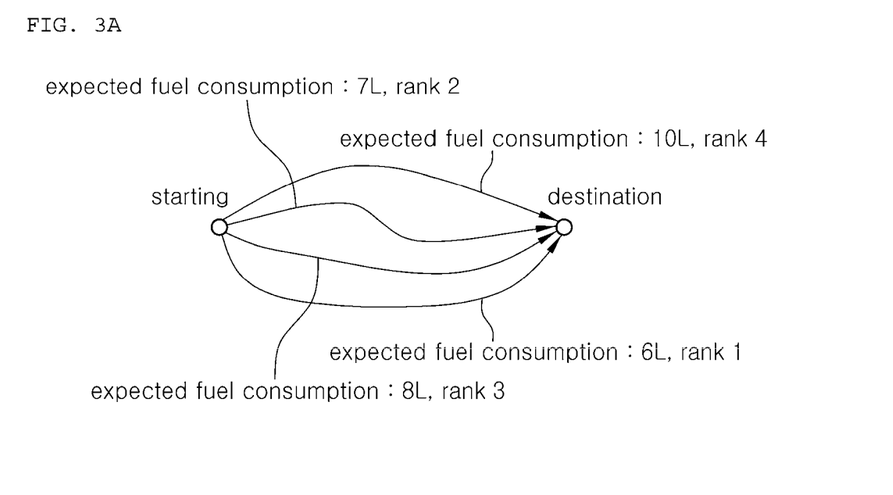
FIG. 3A-FIG. 3C are diagrams illustrating the driving route setting of a navigation and the driving control of a driving controller according to an embodiment of the present disclosure.
Figure 3B:
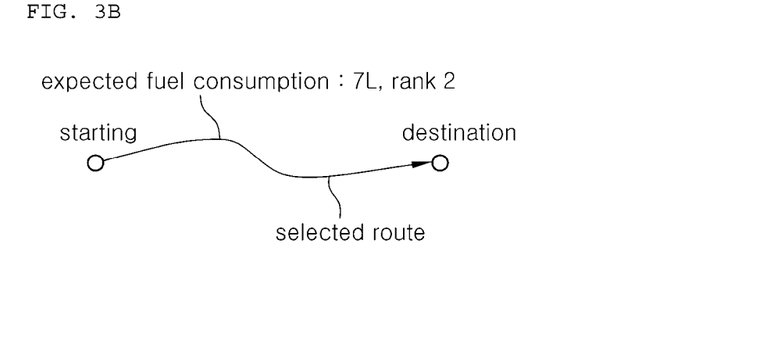
Figure 3C:
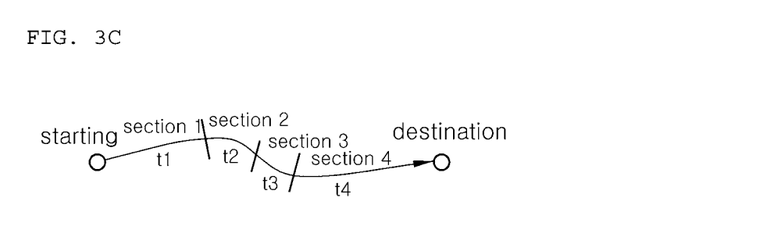

FIG. 3A-FIG. 3C are diagrams illustrating the driving route setting of the navigation 20 and the driving control of the driving controller 40 according to an embodiment of the present disclosure.

Referring further to FIG. 3A-FIG. 3C, the driver or user of a leader vehicle may input a destination of a platoon through the inputter 50, and may selectively input a required arrival time of the platoon. In one embodiment, the required arrival time may be input by limiting to a range between a plurality of required arrival times according to a plurality of driving routes set by the navigation 20.

The navigation 20 may set a driving route based on an input destination and an optionally input required arrival time of a vehicle.

In one embodiment, the navigation 20 may select a route that can reach the destination within the required arrival time while having the lowest fuel consumption among various routes that can reach the destination selected by the user as a minimum cost driving route.

As shown in FIG. 3A, the navigation 20 may generate a driving profile by reflecting the current traffic conditions for each section of roads. Here, the road may be divided into sections according to types of roads such as highways and congested roads in the city, or sections according to the average speed of the road according to the current traffic conditions.

In addition, the navigation 20 calculates an expected fuel consumption in a corresponding route by using an expected average driving speed profile for each route and the data of an average fuel economy table for each vehicle speed, and can assign a rank to each of the searched routes by assigning 1 to the route with the smallest expected fuel consumption and 2 to the route with the next smallest expected fuel consumption.

Here, the highest rank is designated as 1, and then 2, 3, and 4, are designated, and a rank may be assigned to the searched routes according to the expected fuel consumption.

After designating the ranks of the searched routes as described above, only routes that can satisfy the required arrival time are extracted from these routes, and a route with the highest rank among the extracted routes is selected.

For reference, FIG. 3B indicates the route with rank 2 in which the expected fuel consumption was 7 L was selected among the searched routes as shown in FIG. 3A. The route that was assigned with rank 1 in which the expected fuel consumption was 6 L was eliminated because it could not meet the required arrival time.

The expected fuel consumption for each route may be calculated using a previously stored average fuel economy table for each vehicle speed, and a higher rank may be given to a route with a smaller fuel consumption.

The processor 30 may set a driving route using the destination of the platoon input from the inputter 50 and determine a charging strategy of the platoon at the same time. Particularly, when the required arrival time is inputted from the inputter 50, the processor 30 may determine the charging strategy while setting a driving route by considering the required arrival time as well as the destination.

The processor 30 can calculate a required charging amount according to the driving route set in the navigation 20 based on the estimated charging amount or available driving distance of each vehicle, and determine the charging strategy of a platoon based on the calculated required charging amount of each vehicle.

When the processor 30 estimates the charging amount of each vehicle, the processor 30 may calculate the available driving distance. Alternatively, the processor 30 may directly estimate the available driving distance.

The processor 30 may calculate the expected fuel economy of a vehicle based on the driving route set by the navigation 20. Specifically, the processor 30 may calculate an expected fuel economy in consideration of road conditions of the driving route (e.g., highways, national roads, unpaved roads, etc.), real-time traffic conditions (congestion, light-traffic, etc.), and the expected fuel economy of the vehicle may be calculated by further using the driving data or fuel economy data previously stored in the vehicle.

In addition, the processor 30 may calculate the available driving distance or the required charging amount based on the calculated expected fuel economy and the charging amount of the power source estimated by the processor 30.

In one embodiment, the processor 30 may calculate the available driving distance by multiplying the calculated expected fuel economy by the estimated charging amount of the power source. The processor 30 may determine a charging strategy to charge at a charging station located within the calculated available driving distance among the searched charging stations of the power source.

In another embodiment, the processor 30 may calculate the required amount of the power source using the set driving route and the calculated expected fuel economy, and calculate the required charging amount by comparing the calculated required amount of the power source with the estimated charging amount of the power source. The processor 30 may determine the number of charging times and the charging amount to charge the power source on the driving route based on the required charging amount as a charging strategy.

In another embodiment, the processor 30 may determine a charging strategy by simultaneously using an available driving distance and a required charging amount. The processor 30 may determine a charging strategy to charge the required charging amount, but may determine a charging strategy to charge before an available driving distance. In particular, the processor 30 may determine the number of times of charging and the amount of charging according to the strategy selected from a plurality of strategies to be described later.

In one embodiment, the processor 30 may determine a charging strategy such that the number of times of charging is minimized in consideration of the maximum charging amount of a vehicle in case of a minimum time strategy among a plurality of strategies to be described later.

In another embodiment, the processor 30 may determine a charging strategy to minimize a charging cost even if the number of charging increases so as to minimize the charging cost in the case of the minimum cost strategy among a plurality of strategies to be described later. In particular, in order to drive to a charging station where the charging cost is minimized within an available driving distance, the processor 30 may charge a power source corresponding to a part of a required charging amount, and then the power source corresponding to the remaining part of the required charging amount at the charging station where the charging cost is minimized.

That is, the processor 30 may generate a plurality of preset strategies including a minimum time strategy or a minimum cost strategy to be described later as a charging strategy, and select one of the generated plurality of strategies.

Specifically, the processor 30 may receive a selection of a charging strategy manually from a user among a plurality of strategies, or may automatically select a charging strategy based on a driving mode of a vehicle.

That is, the processor 30 may receive a selection of one of a plurality of strategies manually generated by the user at a leader vehicle in a platoon through the inputter 50.

In addition, the processor 30 may automatically select a charging strategy based on a driving mode of a platoon or the vehicle included in the platoon. The driving mode of the platoon may be a platoon driving mode in which a driving route is set in the navigation 20, and the driving mode of the vehicle included in the platoon may be a driving mode in which the steering, acceleration and deceleration and the like is controlled. In one embodiment, the processor 30 may select a minimum cost strategy when the driving mode of the vehicle included in the platoon is the Eco mode, and may select a minimum time strategy when the driving mode of the vehicle is the Sports mode.

Figure 4:
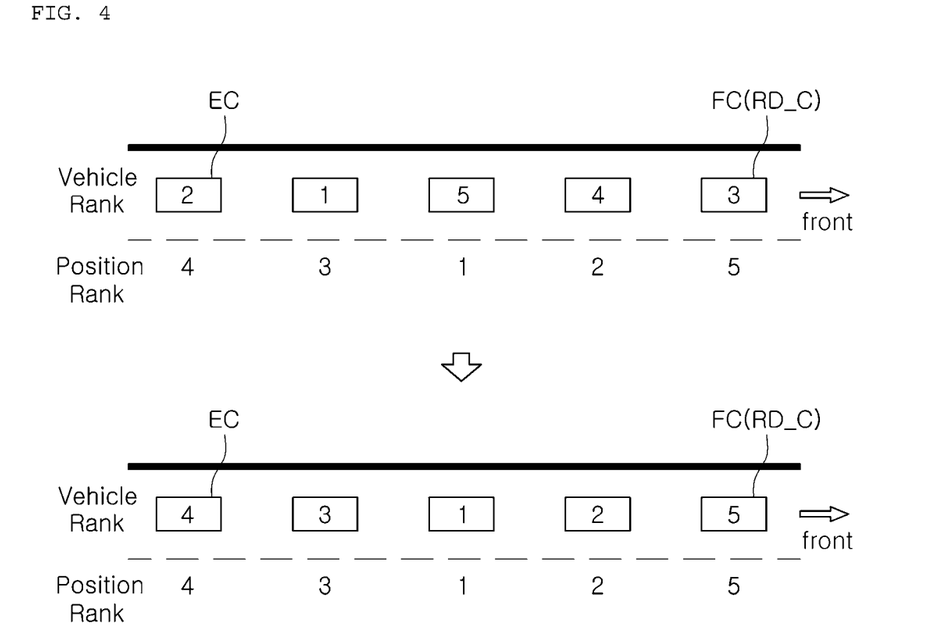
FIG. 4 is a diagram explaining rearrangement of relative positions of vehicles in consideration of a vehicle rank and a position rank according to an embodiment of the present disclosure.

FIG. 4 is a diagram for explaining rearrangement of relative positions of vehicles in consideration of a vehicle rank and a position rank according to an embodiment of the present disclosure.

Referring further to FIG. 4, the driving controller 40 may control the arrangement of a platoon so that the available driving distance of the platoon is increased based on the estimated charging amount or the available driving distance of each vehicle.

As one embodiment, as illustrated in FIG. 4, the smallest number is equal to 1 for the vehicle rank and the position rank, and the vehicle having the same vehicle rank may be arranged at position having the same position rank.

That is, the upper side of FIG. 4 shows a state in which the vehicle rank is given as 1 to the vehicle having the shortest available driving distance at a certain time during platoon driving, and the position rank is given as 1 at the position where the energy consumption rate of the vehicle is lowest.

With the vehicle rank and position rank assigned as described above, the vehicles having the same vehicle ranks as shown in the lower side of FIG. 4 are arranged at positions having the same position ranks.

When arranged in this way, a vehicle with vehicle rank 5 having the longest remaining available driving distance is located at the position with position rank 5, which is the foremost position of the arrangement of the platoon driving, and this vehicle leads the arrangement of the platoon driving as a leader vehicle. However, although it is a position that consumes the most energy, since it is a vehicle with the longest available driving distance, it is possible to expand the average available driving distance of all platooned vehicles.

In addition, the vehicle with vehicle rank 1 due to the shortest available driving distance is placed for platoon driving in a position assigned with position rank 1, which is the lowest energy consumption rate of the vehicle. Thus, it can also contribute to the expansion of the average available driving distance of all platooned vehicles.

When all the vehicles in the platoon are of the same model, the vehicle energy consumption rate according to the relative positions of the vehicles in platoon may be calculated by dividing the amount of fuel consumed during a first reference time or a first reference distance in which the platoon driving continues by the total load of each vehicle.

For example, when the amount of fuel consumed by a vehicle in platooning for 1 hour or 60 km is 10 L, the vehicle energy consumption rate can be calculated by dividing 10 L by the total load of the vehicle including the load weight of the vehicle.

By dividing the amount of fuel consumed by the total load of the vehicle in this way, a more practical comparison of the energy consumption rate of the vehicles according to the relative positions in the arrangement of platoon driving is possible, while excluding the influence due to the difference in the load amount of each vehicle driving in platoon.

On the other hand, when the vehicles forming the platoon are vehicles of different models, the vehicle energy consumption rate according to the relative positions of the vehicles forming the platoon is desirably calculated by dividing the fuel amount consumed by each vehicle during a first reference distance or a first reference time in which platoon driving continuous by the total load of a corresponding vehicle, and then by dividing this value by the frontal projected area and air resistance coefficient (Cd: drag coefficient) of the corresponding vehicle.

That is, when the models of vehicles participating in the platoon driving are different, the difference in air resistance resulting from the difference in the shape of the vehicle can be considered to allow a more appropriate comparison of the vehicle energy consumption rate according to the relative positions. Because of this, as described above, the vehicle energy consumption rate is calculated by dividing the amount of fuel consumed by a vehicle for a certain time or distance by the total load of the corresponding vehicle, and then dividing the value by the front projection area and the air resistance coefficient of the vehicle.

In this way, the comparison of vehicle energy consumption rates can be made by considering only the influence of the relative positions of the arrangement of platoon driving, as much as possible, despite differences in the load amount, model, and shape of the vehicles forming the platoon. Thus, it is possible to form more appropriate rearrangement of vehicle locations.

Accordingly, the first reference distance and the first reference time are levels that can relatively and accurately determine the vehicle energy consumption rate at a corresponding location according to the above-described purpose, and may be designed by a number of experiments and analysis.

As described above, the vehicle rank and the position rank are assigned, and accordingly, such assigning can be repeatedly and periodically performed during the platoon driving.

The change of the position rank may be occurred by the changes in the platooning environment during platoon driving, such as changes in the vehicle rank due to changes in the fuel consumption and performance of each vehicle or the like, and changes in the air resistance acting on each vehicle due to the changes in wind direction. Thus, a new vehicle arrangement is planned by reflecting these changes, so that the available driving distance of the entire platoon driving can be further increased.

In another embodiment, the driving controller 40 selects a vehicle with a minimum available driving distance as a vehicle subject to care, and locates the vehicle subject to care immediately after the leader vehicle RD_C, and shares the driving information of the leader vehicle RD_C with the vehicle subject to care. The vehicle subject to care can be driven to minimize energy consumption based on the shared information. Accordingly, the available driving distance of all platooned vehicles is maximized.

If the vehicle subject to care is a previous leader vehicle, a new leader vehicle is selected, and the new leader vehicle is placed in the forefront of the arrangement, so that the vehicle subject to care is placed in immediately after the leader vehicle.

In other words, if the previous leader vehicle, which has led the arrangement of platooning vehicles so far, is determined to have the shortest available driving distance and is selected as the vehicle subject to care, for example, the vehicle with the best sensor configuration or performance is selected as a new leader vehicle. If the new leader vehicle is moved and placed in front of the previous leader vehicle, the previous leader vehicle, which is subject to care, is automatically located immediately after the new leader vehicle.

Of course, in the case where the vehicle immediately after the leader vehicle is selected as the vehicle subject to care, the process of placing the vehicle subject to care in immediately after the leader vehicle is omitted since the vehicle subject to care is already located in the immediately after the leader vehicle.

In addition, if the vehicle subject to care is selected as a vehicle other than the previous leader vehicle and the vehicle immediately after it, a first lane change is performed to the lane adjacent to the previous lane in which the vehicle subject to care was running in a platoon, a space to insert the vehicle subject to care is formed between the leader vehicle RD_C and the vehicles immediately after the leader vehicle, and a second lane change is performed to move the vehicle subject to care on the adjacent lane to the space so that the vehicle subject to care is placed in immediately after the leader vehicle RD_C.

At this time, performing the first lane change of the vehicle subject to care and forming a space to insert the vehicle subject to care may be performed sequentially, but it is also desirable to perform the performing and forming at the same time so that the moving arrangement of the vehicle subject to care can be quickly completed.

The driving information of the leader vehicle RD_C shared with the vehicle subject to care includes an expected driving speed profile and an expected driving path of the leader vehicle.

That is, the leader vehicle shares the driving speed profile and the driving route with the vehicle subject to care in real time, so that the vehicle subject to care can drive using the shared information of the leader vehicle RD_C.

The vehicle subject to care may be driven to minimize energy consumption by minimizing braking in consideration of the expected driving speed profile of the leader vehicle RD_C.

For example, if the leader vehicle RD_C is currently accelerating, but it is determined from the expected driving speed profile of the leader vehicle RD_C that deceleration will begin immediately after, the vehicle subject to care maintains the current speed without accelerating less than the leader vehicle RD_C or accelerating. Thus, the amount of braking that will be required soon is decreased, ultimately minimizing energy consumption.

In addition, the vehicle subject to care may travel along the expected driving path of the leader vehicle RD_C without searching for an independent driving path, thereby minimizing energy consumption while driving.

That is, each vehicle that performs platoon driving is driven in an arrangement, and it is common to individually search for its own driving route and drive almost similarly to independent autonomous driving. But, after being selected as a vehicle subject to care, the independent driving route search is not separately performed as mentioned above. Accordingly, the sensors used for driving route search can be turned off, and the energy required to process data from these sensors can be reduced, thereby minimizing energy consumption while the driving.

Of course, the vehicle subject to care is to be driven by following the expected driving route of the preceding leader vehicle RD_C instead of searching for its own driving route as described above. It is more desirable to be performed together with a following mode below.

In other words, the vehicle subject to care minimizes the energy consumed by the sensors and the computing power to process data from these sensors by turning off all other sensors other than the sensor for following the leader vehicle RD_C, and drives with the minimized energy consumption by driving in a following mode that follows the leader vehicle RD_C, depending only on the information of the remaining on-state sensors.

In the following mode, additional sensors can be further turned off in addition to the sensors required to search the driving route, and the computing power required for data processing can be further reduced.

For reference, as a sensor that maintains the on-state even when driving in the following mode, for example, there may be a distance sensor for maintaining a distance between the vehicle and the leader vehicle RD_C in front.

When driving in the following mode, the vehicle subject to care follows with a minimum separation distance, which is the minimum distance that can avoid a collision during emergency braking of the leader vehicle RD_C so that air resistance can be reduced as much as possible. Accordingly, it is desirable to minimize energy consumption while driving.

Here, the minimum separation distance is the distance at a level at which a collision with the leader vehicle RD_C can be avoided when the braking of the same level or higher than the braking of the leader vehicle RD_C is immediately started in the vehicle subject to care by transmitting braking information during the emergency braking of the leader vehicle RD_C at the same time as possible. The distance can be determined by a design through a number of experiments and analysis. The design can be designed to have a tendency to become longer as the communication speed between the leader vehicle RD_C and the vehicle subject to care is longer, and the loading load of the vehicle subject to care is greater than that of the leader vehicle.

On the other hand, the vehicle subject to care is selected as described above, and it is determined whether a certain redetermination condition is satisfied while the vehicle subject to care drives with the minimized energy consumption. If the redetermination condition is satisfied, it can change the vehicle subject to care by repeatedly checking the available driving distance according to the fuel amount and the fuel economy of each vehicle included in the platoon driving.

That is, the redetermination condition may be set as whether or not a certain period of time has elapsed, such as whether or not 2 hours have elapsed since the selection of the vehicle subject to care. When the platoon driving is performed while minimizing the energy consumption of the vehicle subject to care for a certain time, as described above, the available driving distance of each vehicle may be changed due to the driving in the meantime. Thus, the vehicle subject to care can be changed by reflecting such change.

For reference, in the present disclosure as described above, the controller of each vehicle performing platooning can make a determination in parallel to control each vehicle, or the controller of some selected vehicles, such as a leader vehicle, can make determination and transmit commands through communication so that the controllers of the remaining vehicles can control each vehicle according to the command.

The processor 30 may calculate the charging cost of a power source based on the cost information of a searched charging station, and determine a minimum cost strategy that minimizes the calculated charging cost as a charging strategy.

The cost information of a charging station may be the cost of a power source sold at a corresponding charging station, or may be a cost reflecting a promotion such as a discount.

More specifically, the processor 30 may calculate the charging cost of the power source based on the input or pre-stored payment information of a user or the vehicle included in a platoon.

In the case of card payment, the input or pre-stored vehicle or user's payment information may include benefits such as discount or rewards corresponding to the card. The user's payment information may be directly or indirectly input or pre-stored in the vehicle, and the vehicle payment information may be pre-stored in the vehicle through Car Pay or the like.

That is, the processor 30 may calculate the charging cost of the power source by simultaneously reflecting the cost information of the charging station and the payment information of the vehicle or the user, and may determine a minimum cost strategy that minimizes the calculated charging cost.

Referring further to FIG. 3C, when the processor 30 determines the minimum cost strategy as a charging strategy, the driving controller 40 may divide the driving route into a plurality of sections based on the driving information of the driving route set in the navigation 20, allocate a required time for each section, and control the driving of a platoon based on an optimum fuel economy according to the required time allocated for each section and the driving information.

The driving controller 40 can maximize the fuel economy of a vehicle on the premise of arriving at a destination within a required arrival time by dividing a driving route into a plurality of sections and controlling the vehicle to minimize fuel consumption while considering the required time allocated for each section.

Specifically, the driving controller 40 may generate a driving profile by reflecting a current traffic condition for each section of a driving route. Here, the plurality of sections may be divided into sections according to types of roads such as highways and congested roads in the city, or the sections may be divided according to the average speed of roads according to the current traffic condition.

The driving controller 40 may divide the sections of a driving route as shown in FIG. 3C and allocate a required time for each section. In this case, the required time may be allocated for each section such that a value obtained by adding a preset predetermined spare time to the sum of the required times of each section is within a remaining time until a required arrival time.

When each required time t1 to t4 is allocated to sections 1 to 4 shown in FIG. 3C, t1 to t4 may be allocated such that the following equation is satisfied.

$$t1+t2+t3+t4+\text{spare time}<=\text{remaining time}$$

Here, the spare time is set in order to allow a vehicle to arrive at a destination within the required arrival time as much as possible, even in the case that the time required for the vehicle to travel each section actually becomes longer than expected due to deterioration of the traffic condition. For example, it can be set, such as around 5% of the remaining time.

Specifically, the driving controller 40 may control the driving of the vehicle at the speed having the optimum fuel economy according to the driving information. Particularly, the vehicle can be driven at a vehicle speed that is as close to the economic speed as possible within a range that satisfies the required time of a corresponding section. The economic speed may be set based on a pre-stored average fuel economy table for each vehicle speed. The average fuel economy table for each speed can be continuously updated.

Alternatively, the driving controller 40 may minimize fuel consumption of a vehicle by driving the vehicle at a vehicle speed as low as possible within a range that satisfies the required time of a corresponding section.

In general, this is because fuel economy tends to decrease as a vehicle speed increases, so when considering this tendency, the driving speed of the vehicle is reduced as much as possible within the range that satisfies the required time, thereby ultimately maximizing fuel efficiency.

In another embodiment, the processor 30 may calculate a required time according to the driving route set in the navigation 20 based on the expected charging time of a searched charging station, and determine a minimum time strategy that minimizes the calculated required time as a charging strategy.

Here, the expected charging time may be calculated in consideration of the congestion level of a searched charging station, the number of chargers at the charging station, real-time traffic conditions in a section before or after the charging station in a driving route, or the like. In particular, the expected charging time may be different according to a result of comparing the number of vehicles included in a platoon with the number of chargers in the charging station.

That is, a time difference between the case of the platoon's stopping and charging at the corresponding charging station and then staring again and the case of skipping the corresponding charging station may be calculated as the expected charging time.

The processor 30 may calculate the charging cost of a power source based on the cost information of the charging station included in the minimum time strategy in which a calculated required time is calculated equally, and determine the minimum time strategy that minimizes the calculated charging cost as a charging strategy.

Here, the meaning that the calculated required time is calculated equally may mean a case where the calculated required time differs within a preset time range (e.g., 5 minutes).

When the required time calculated for the plurality of minimum time strategies is the same level, the processor 30 may determine the minimum time strategy that minimizes the charging cost as a charging strategy.

When the processor 30 determines the minimum time strategy as the charging strategy, the driving controller 40 may control the driving of a platoon to minimize the required time according to the driving route set by the navigation 20.

More specifically, when the processor 30 determines the minimum time strategy as the charging strategy, the driving controller 40 may control the speed, lanes, and steering of a vehicle to minimize the required time. That is, the driving controller 40 may control the driving of the vehicle to minimize the required time through active lane change control, acceleration and the like.

Figure 5:
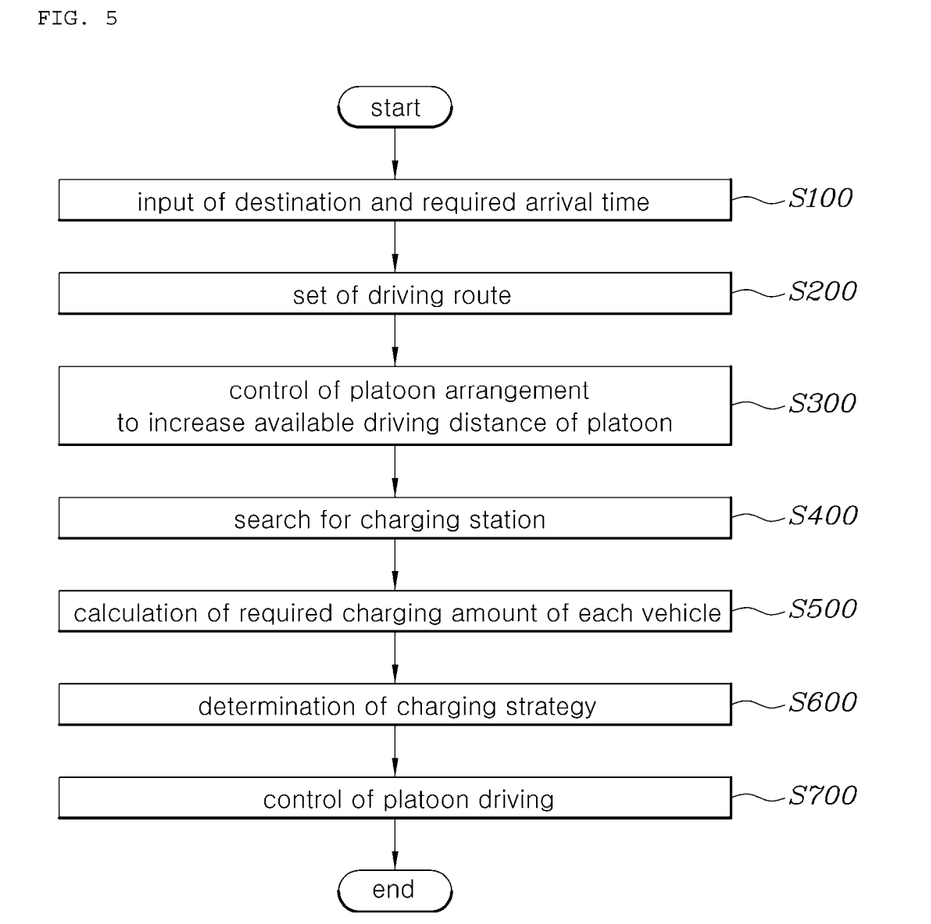
FIG. 5 is a flowchart of a method for controlling vehicle platoon driving according to an exemplary embodiment of the present disclosure.

FIG. 5 is a flowchart of a method for controlling platoon driving of a vehicle according to an embodiment of the present disclosure.

Referring further to FIG. 5, a method for controlling platoon driving of a vehicle according to an embodiment of the present disclosure includes the steps of setting a driving route based on a destination of a platoon (S200); searching for a charging station of a power source that drives a driving device of each vehicle included in the platoon based on the set driving route (S400); determining a charging strategy of the power source of the platoon based on a charging amount of the power source or available driving distance of each vehicle, the driving route set by a navigation 20, and the searched charging station (S600); and controlling the driving of the platoon based on the set driving route and the determined charging strategy (S700).

Prior to determining a charging strategy (S600), the step of estimating the charging amount of the power source (not shown) may be further included, and the charging amount of the power source may be estimated in real time.

Prior to the step of setting a driving route (S200), the step of inputting the destination of the platoon or selectively inputting a required arrival time of the platoon (S100) may be further included, and, in the step of determining a charging strategy (S600), when the required arrival time is input, the charging strategy can be determined based on the destination and the required arrival time.

Prior to the step of determining a charging strategy (S600), the step of calculating a required charging amount of each vehicle according to the driving route set by the navigation 20 based on an estimated charging amount or available driving distance of each vehicle (S500) is further included, and in the step of determining a charging strategy (S600), the charging strategy of the platoon can be determined based on the calculated required charging amount of each vehicle.

Prior to determining a charging strategy (S600), the step of controlling an arrangement of the platoon so that the available driving distance of the platoon is increased based on the estimated charging amount or available driving distance of each vehicle (S300) may be further included.

In the step of determining a charging strategy (S600), a charging cost of the power source may be calculated based on the cost information of the searched charging station, and a minimum cost strategy that minimizes the calculated charging cost may be determined as the charging strategy.

In the step of determining a charging strategy (S600), the charging cost of the power source may be calculated based on the input or pre-stored payment information of a user or each vehicle included in the platoon.

In the step of controlling the driving of the platoon (S700), when a minimum cost strategy is determined as the charging strategy, the driving route may be divided into a plurality of sections based on the driving information of the set driving route, a required time may be allocated for each section, and the driving of the platoon may be controlled based on an optimal fuel economy according to the required time allocated for each section and the driving information.

In the step of determining a charging strategy (S600), the required time according to the set driving route may be calculated based on the expected charging time of the searched charging station, and a minimum time strategy that minimizes the calculated required time may be determined as the charging strategy.

In the step of determining a charging strategy (S600), the charging cost of the power source may be calculated based on the cost information of the charging station included in the minimum time strategy in which the calculated required time is calculated equally, and the minimum time strategy that minimizes the calculated charging cost may be determined as the charging strategy.

In the step of controlling the driving of the platoon (S700), when the minimum time strategy is determined as the charging strategy, the driving of the platoon may be controlled to minimize the required time according to the set driving route.

Although shown and described in relation to specific embodiments of the present disclosure, it will be obvious to those of ordinary skilled in the art that the present disclosure can be variously improved and changed within the limit without departing from the technical spirit of the present disclosure provided by the following claims.

What is claimed is:

1. A platoon driving control system of a vehicle comprising a processor and a driving controller communicatively connected to the processor, wherein the processor is configured to:
   estimate a charging amount of a power source that drives a driving device or an available driving distance of each vehicle included in a platoon,
   set a driving route based on a destination of the platoon and to search for a charging station for the power source based on the set driving route, and
   determine a charging strategy of the power source of the platoon based on the estimated charging amount or the estimated available driving distance of each vehicle, the set driving route, and the searched charging station, and
   the driving controller is configured to control driving of the platoon based on the set driving route and the determined charging strategy,
   wherein the driving controller controls an arrangement of the platoon by matching a rank of each vehicle in the platoon based on the estimated charging amount or the estimated available driving distance of the corresponding vehicle, with a rank of energy consumption rate positions which are based on relative positions of the vehicles in the platoon, so that an available driving distance of the platoon can be maximized, wherein the processor selects the charging strategy of the platoon between a minimum cost strategy and a minimum time strategy based on a driving mode of the platoon, where the driving mode of the platoon is a driving mode in which steering, acceleration and deceleration of the vehicle are controlled, wherein the processor calculates an energy consumption rate of each vehicle in the platoon based on whether the vehicles forming the platoon are of a same model or different models, wherein a combination of parameters used in calculating the energy consumption rate in an event where the vehicles forming the platoon are of the different models is different from a combination of parameters used in calculating the energy consumption rate in an event where the vehicles forming the platoon are of the same model, and wherein the processor selects the minimum cost strategy when the driving mode of the vehicle included in the platoon is an Eco mode, and selects the minimum time strategy when the driving mode of the vehicle is a Sports mode.

2. The platoon driving control system of the vehicle according to claim 1, further comprising an inputter that is configured to receive the destination of the platoon or selectively receive a required arrival time of the platoon, wherein the processor determines the charging strategy based on the destination and the required arrival time when the required arrival time is inputted to the inputter.

3. The platoon driving control system of the vehicle according to claim 1, wherein the processor calculates a required charging amount for each vehicle according to the set driving route based on the estimated charging amount or the estimated available driving distance of each vehicle, and determines the charging strategy of the platoon based on the calculated required charging amount of each vehicle.

4. The platoon driving control system of the vehicle according to claim 1, wherein the processor calculates a charging cost of the power source based on cost information of the searched charging station, and determines the minimum cost strategy that minimizes the calculated charging cost as the charging strategy.

5. The platoon driving control system of the vehicle according to claim 4, wherein the processor calculates the charging cost of the power source based on inputted or pre-stored payment information of a user or each vehicle included in the platoon.

6. The platoon driving control system of the vehicle according to claim 4, wherein when the processor determines the minimum cost strategy as the charging strategy, the driving controller divides the driving route into a plurality of sections based on driving information of the set driving route, allocates a required time for each section, and controls the driving of the platoon based on an optimum fuel economy according to the required time allocated for each section and the driving information.

7. The platoon driving control system of the vehicle according to claim 1, wherein the processor calculates a required time according to the set driving route based on an expected charging time of the searched charging station, and determines the minimum time strategy that minimizes the calculated required time as the charging strategy.

8. The platoon driving control system of the vehicle according to claim 7, wherein the processor calculates a charging cost of the power source based on cost information of the charging station included in the minimum time strategy in which the calculated required time is calculated equally, and determines the minimum cost strategy that minimizes the calculated charging cost as the charging strategy.

9. The platoon driving control system of the vehicle according to claim 1, wherein when the processor determines the minimum time strategy as the charging strategy, the driving controller controls the driving of the platoon to minimize required time according to the set driving route.

10. A method for controlling platoon driving of a vehicle comprising steps of:

setting a driving route based on a destination of a platoon;

searching for a charging station of a power source that drives a driving device of each vehicle included in the platoon based on the set driving route;

controlling an arrangement of the platoon by matching a rank of each vehicle in the platoon based on an estimated charging amount or an estimated available driving distance of the corresponding vehicle, with a rank of energy consumption rate positions which are based on relative positions of the vehicles in the platoon, so that an available driving distance of the platoon can be maximized;

determining a charging strategy of the power source of the platoon based on a charging amount of the power source or an available driving distance of each vehicle, the set driving route, and the searched charging station; and controlling the driving of the platoon based on the set driving route and the determined charging strategy, wherein the step of determining the charging strategy comprises selecting the charging strategy of the platoon between a minimum cost strategy and a minimum time strategy based on a driving mode of the platoon, where the driving mode of the platoon is a driving mode in which steering, acceleration and deceleration of the vehicle are controlled, wherein the step of determining the charging strategy further comprises calculating an energy consumption rate of each vehicle in the platoon based on whether the vehicles forming the platoon are of a same model or different models, wherein a combination of parameters used in calculating the energy consumption rate in an event where the vehicles forming the platoon are of the different models is different from a combination of parameters used in calculating the energy consumption rate in an event where the vehicles forming the platoon are of the same model, and wherein the step of selecting the charging strategy of the platoon between the minimum cost strategy and a minimum time strategy comprises selecting the minimum cost strategy when the driving mode of the vehicle included in the platoon is an Eco mode, and selecting the minimum time strategy when the driving mode of the vehicle is a Sports mode.

11. The method for controlling platoon driving of the vehicle according to claim 10, further comprising, prior to the step of setting a driving route, a step of inputting the destination of the platoon or selectively inputting a required arrival time of the platoon, wherein in the step of determining the charging strategy, when the required arrival time is inputted, the charging strategy is determined based on the destination and the required arrival time.

12. The method for controlling platoon driving of the vehicle according to claim 10, further comprising, prior to the step of determining the charging strategy, a step of calculating a required charging amount of each vehicle according to the set driving route based on an estimated charging amount or an estimated available driving distance of each vehicle,     wherein in the step of determining the charging strategy, the charging strategy of the platoon is determined based on the calculated required charging amount of each vehicle.

13. The method for controlling platoon driving of the vehicle according to claim 10, wherein in the step of determining the charging strategy, a charging cost of the power source is calculated based on cost information of the searched charging station, and the minimum cost strategy that minimizes the calculated charging cost is determined as the charging strategy.

14. The method for controlling platoon driving of the vehicle according to claim 13, wherein in the step of determining the charging strategy, the charging cost of the power source is calculated based on inputted or pre-stored payment information of a user or each vehicle included in the platoon.

15. The method for controlling platoon driving of the vehicle according to claim 13, wherein in the step of controlling the driving of the platoon, when the minimum cost strategy is determined as the charging strategy, the driving route is divided into a plurality of sections based on driving information of the set driving route, a required time is allocated for each section, and the driving of the platoon is controlled based on an optimal fuel economy according to the required time allocated for each section and the driving information.

16. The method for controlling platoon driving of the vehicle according to claim 10, wherein in the step of determining the charging strategy, a required time according to the set driving route is calculated based on an expected charging time of the searched charging station, and the minimum time strategy that minimizes the calculated required time is determined as the charging strategy.

17. The method for controlling platoon driving of the vehicle according to claim 16, wherein in the step of determining the charging strategy, a charging cost of the power source is calculated based on cost information of the charging station included in the minimum time strategy in which the calculated required time is calculated equally, and the minimum cost strategy that minimizes the calculated charging cost is determined as the charging strategy.

18. The method for controlling platoon driving of the vehicle according to claim 10, wherein in the step of controlling the driving of the platoon, when the minimum time strategy is determined as the charging strategy, the driving of the platoon is controlled to minimize a required time according to the set driving route.

\* \* \* \* \*